United States Patent
Jonsson et al.

(10) Patent No.: US 9,616,565 B2
(45) Date of Patent: Apr. 11, 2017

(54) ADJUSTING PARAMETERS OF A DYNAMICAL ROBOT MODEL

(71) Applicant: ABB Schweiz AG, Baden (CH)

(72) Inventors: Ingvar Jonsson, Vasteras (SE); Stig Moberg, Vasteras (SE); Sven Hanssen, Vasteras (SE)

(73) Assignee: ABB Schweiz AG, Baden (CH)

( * ) Notice: Subject to any disclaimer, the term of this patent is extended or adjusted under 35 U.S.C. 154(b) by 110 days.

(21) Appl. No.: 14/570,806

(22) Filed: Dec. 15, 2014

(65) Prior Publication Data

US 2015/0100156 A1    Apr. 9, 2015

Related U.S. Application Data (63) Continuation of application No. PCT/EP2012/062277, filed on Jun. 26, 2012.

(51) Int. Cl.
- *G06F 19/00* (2011.01)
- *B25J 9/16* (2006.01)
- *G05B 13/04* (2006.01)

(52) U.S. Cl.
CPC ............ *B25J 9/1605* (2013.01); *B25J 9/1653* (2013.01); *G05B 13/04* (2013.01); *G05B 2219/40527* (2013.01); *Y10S 901/02* (2013.01)

(58) Field of Classification Search
CPC ............ B25J 9/1656; B25J 2219/36472; B25J 9/1605; B25J 9/1653; B25J 9/40527;

(Continued)

(56) References Cited

U.S. PATENT DOCUMENTS

| | | | |
|---|---|---|---|
| 4,831,549 A | | 5/1989 | Red et al. |
| 4,860,215 A | * | 8/1989 | Seraji ................. G05B 19/4163 700/260 |

(Continued)

FOREIGN PATENT DOCUMENTS

| | | |
|---|---|---|
| DE | 102006055917 A1 | 6/2008 |
| EP | 0963816 B1 | 3/2006 |

(Continued)

OTHER PUBLICATIONS

English Translation for reference EP1920892.*

(Continued)

*Primary Examiner* — Rachid Bendidi
(74) *Attorney, Agent, or Firm* — Whitmyer IP Group LLC (57) ABSTRACT

A method, robot arrangement and computer program product for tuning a dynamical model of an industrial robot on a foundation. The parameter determining device includes a model memory with a first dynamical model of the robot, the first dynamical model including first model parameters representing dynamical properties of the robot; and a second dynamical model of a foundation to which the robot is to be attached, the second dynamical model including second model parameters representing dynamical properties of the foundation, and a parameter adjusting unit that obtains information about dynamical properties of the foundation by ordering the actuator to move the robot and by receiving, from the detector, measurements of at least one property affected by the movement; and set at least one of the second model parameters on the basis of the dynamical properties of the foundation.

18 Claims, 4 Drawing Sheets

(58) Field of Classification Search
CPC ...... B25J 9/1674; Y10S 901/02; G05B 13/04; G05B 2219/36472; G05B 2219/40527
See application file for complete search history.

(56) References Cited

U.S. PATENT DOCUMENTS

| | | | |
|---|---|---|---|
| 4,999,553 | A | 3/1991 | Seraji |
| 5,357,424 | A | 10/1994 | Kakizaki et al. |
| 5,497,061 | A * | 3/1996 | Nonaka ............... B25J 9/1633 318/568.1 |
| 6,218,801 | B1 * | 4/2001 | Brogårdh ............ B25J 9/1674 318/565 |
| 6,343,243 | B1 | 1/2002 | Brogårdh et al. |
| 6,642,922 | B1 | 11/2003 | Noda |
| 7,853,356 | B2 | 12/2010 | Tsai et al. |
| 2006/0048364 | A1 | 3/2006 | Zhang et al. |

FOREIGN PATENT DOCUMENTS

| | | |
|---|---|---|
| EP | 1920892 B1 | 12/2010 |
| WO | 0060427 A1 | 10/2000 |
| WO | 2006117022 A1 | 11/2006 |
| WO | 2008052234 A1 | 5/2008 |

OTHER PUBLICATIONS

B. Subudhi, et. al.; "Dynamic modelling, simulation and control of a manipulator with flexible links and joints"; Robotics and Autonomous Systems 41 (2007). pp. 257-270.
Mavroidis, C., et al.; "End-point control of long reach manipulator system"; Massachusetts Institute of Technology; pp. 6.
International Search Report & Written Opinion Application No. PCT/EP2012/062277 Completed: Feb. 26, 2013; Mailing Date: Mar. 5, 2013 pp. 9.
Moberg, Stig, et. al.; "Modeling and Parameter Estimation of Robot Manipulators using Extended Flexible Joint Models"; pp. 71.

* cited by examiner

ADJUSTING PARAMETERS OF A DYNAMICAL ROBOT MODEL

FIELD OF THE INVENTION

The present invention relates to the field of robots. The invention more particularly relates to a method, robot arrangement and computer program product for tuning a dynamical model of an industrial robot on a foundation.

BACKGROUND OF THE INVENTION

The control of industrial robots is often made based on a model of the robot.

U.S. Pat. No. 5,357,424 does for instance describe the estimating of parameters in a stiff dynamic model of a robot.

WO 2006/117022 describes the estimating of such parameters, when parts of the stiff model are already known.

However, it is often important to determine the elastic dynamical parameters of a robot in order to be able to operate it efficiently.

A robot is normally provided on a foundation. The foundation may at times differ from ground and then the foundation should be included in the model when determining the elastic parameters. If this is not done the robot may not be able to operate at its full potential.

EP 1920892 does describe an elastic robot model where the foundation is included. Here also a load is provided as a part of the model.

The parameters of the model in EP 1920892 have to be set at the point in time when the properties of the foundation are known, which is typically after the robot has been mounted on the foundation. This means that the values of the parameters associated with the foundation are determined at this point in time. The determination does furthermore seem to be manual. There is no automatic determination of parameters.

This is both time consuming and complex. Furthermore, once a robot has been mounted on a foundation, there is a desire to put it into operations as quickly as possible. There is therefore a need for simplifying the setting of dynamical model parameters after mounting of the robot on a foundation.

SUMMARY OF THE INVENTION

The present invention is therefore directed towards setting of dynamical and elastic model parameters after the mounting of the robot on a foundation. The invention is more particularly directed towards tuning of dynamical model parameters for a robot after the robot has been mounted on a foundation.

One object of the present invention is to provide a method for tuning a dynamical model of an industrial robot on a foundation.

This object is according to a first aspect of the present invention achieved through a method for tuning a dynamical model of an industrial robot on a foundation, the method comprising the steps of:
providing a first dynamical model of the robot, the first dynamical model comprising first model parameters representing dynamical properties of the robot;
providing a second dynamical model of a foundation the robot is attached to, the second dynamical model comprising second model parameters representing dynamical properties of the foundation;
obtaining information about dynamical properties of the foundation by moving the robot and by measuring at least one property affected by the movement; and
setting at least one of the second model parameters on the basis of the dynamical properties of the foundation.

Another object of the present invention is to provide a robot arrangement comprising an industrial robot and a parameter determining device for tuning a dynamical model of an industrial robot on a foundation.

This object is according to a second aspect of the present invention achieved through a robot arrangement comprising an industrial robot and a parameter determining device,
the industrial robot comprising
a number of moveable arm sections,
at least one actuator for moving a corresponding arm section,
and
at least one detector,
the parameter determining device comprising
a model memory comprising
a first dynamical model of the robot, the first dynamical model comprising first model parameters representing dynamical properties of the robot; and
a second dynamical model of a foundation to which the robot is to be attached, the second dynamical model comprising second model parameters representing dynamical properties of the foundation; and
a parameter adjusting unit configured to
obtain information about dynamical properties of the foundation by ordering the actuator to move the robot and by receiving, from the detector, measurements of at least one property affected by the movement; and
set at least one of the second model parameters on the basis of the dynamical properties of the foundation.

A parameter determining device may be a part of the control system for the robot. Alternatively it may be provided in the form of a computer communicating with the control system of the computer.

Another object of the present invention is to provide a computer program product for tuning a dynamical model of an industrial robot on a foundation.

This object is according to a third aspect of the present invention achieved through a computer program product for tuning a dynamical model of an industrial robot on a foundation, the industrial robot being equipped with a number of moveable arm sections, at least one actuator and at least one detector, the computer program product comprising a data carrier with computer program code which when run in a parameter determining device, causes the parameter determining device to obtain a first dynamical model of the robot, the first dynamical model comprising first model parameters representing dynamical properties of the robot;
obtain a second dynamical model of a foundation to which the robot is to be attached, the second dynamical model comprising second model parameters representing dynamical properties of the foundation,
obtain information about dynamical properties of the foundation by ordering the actuator to move the robot and by receiving, from the detector, measurements of a property affected by the movement; and
set at least one of the second model parameters on the basis of the dynamical properties of the foundation.

The present invention has many advantages. Since the tuning is focused on the parameters of the second model, it is fast, simple and efficient. Thereby a robot can be put into effective use quickly after being mounted on a foundation. The use of a tuned model furthermore raises the efficiency of the robot and the accuracy of its use compared with an untuned use.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
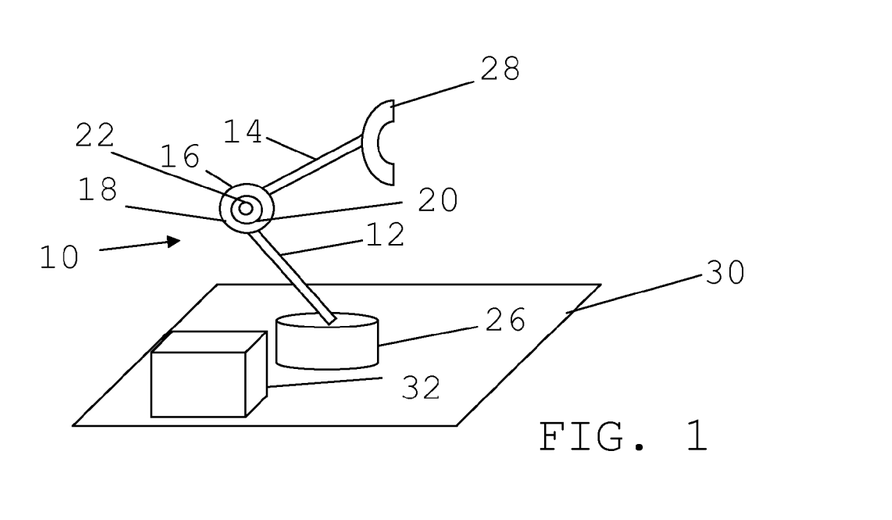
FIG. 1 schematically shows a robot arrangement comprising a robot and parameter determining device, FIG. 2 schematically shows a joint of the robot with an actuator and primary sensor.

FIG. 1 schematically shows a robot arrangement comprising a robot 10 and a parameter determining device 32. The robot 10 comprises a number of arm sections 12, 14 connected to each other via joints 16. The robot 10 shown in FIG. 1 is simplified and therefore only two arm sections are shown, a first and a second arm section 12 and 14, connected to each other via a joint 16. It should however be realized that a robot normally comprises many more arm sections, typically six and consequently also several more joints.

The first arm section 12 is here connected to the foundation 26. In this way the robot 10 is attached to the foundation 26. The second arm section 14 normally comprises a tool holder for allowing a tool to be connected to the robot 10. In FIG. 1 one such tool 28 is shown as being attached to the second arm section 14.

In the context in which the invention is provided, the foundation 26 is separated from ground 30. This means that the foundation 26 is placed on ground 30. In order to move the second arm section 14 in relation to the first arm section 12 there is provided an actuator 20 at the joint 16, which actuator 20 may be implemented as a servo motor. On this actuator 20 there is furthermore provided a primary sensor 22. The primary sensor 22 is thus associated with the actuator 20, for instance through being attached to it. The primary sensor 22 is furthermore arranged to sense at least one property, such as a property of the robot, where variations in the property are being caused by the operation of the actuator 20. In this example one such property being sensed is a position of the robot 10 and more specifically the position of the second arm section 14. There may be one such primary sensor associated with each actuator of the robot. If the actuator 20 is a servo motor, there may thus be one such primary sensor 22 provided for each servo motor of the robot 10. One such primary sensor may furthermore be placed or mounted on the corresponding actuator. The primary sensor 22 may furthermore be implemented in the form of a position sensor.

Figure 2:
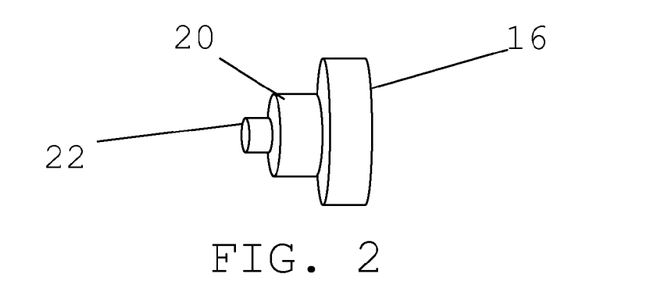

The joint 16, with actuator 20 and primary sensor 22 is also schematically shown in FIG. 2, which figure shows a perspective view of these elements.

The robot 10 may furthermore comprise secondary sensors such as accelerometers, gyros or encoders mounted on other positions of the robot.

The parameter determining device 32 is connected to the robot 10 and more particularly to the actuator 20 and the primary sensor 22 of the robot 10.

Figure 3:
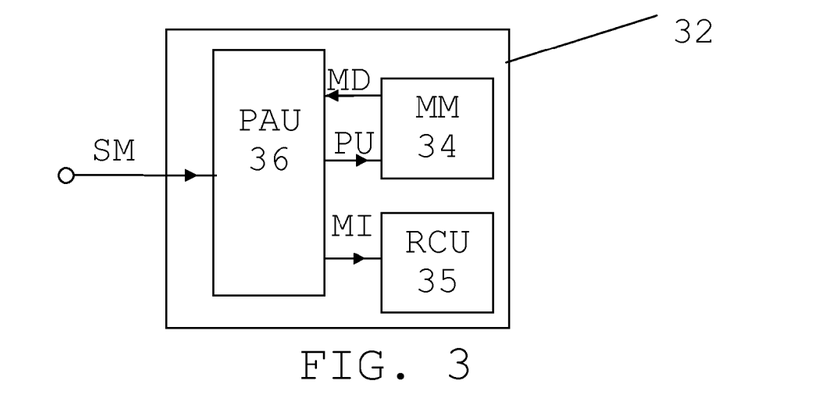
FIG. 3 shows a block schematic of the parameter determining device, FIG. 4 schematically shows the content of a model memory of the parameter determining device, FIG. 5 schematically shows three dynamical models connected to each other, where the models represent a foundation, the robot and a tool.

A block schematic of the parameter determining device 32 is shown in FIG. 3. The parameter determining device 32 comprises a model memory MM 34, and a parameter adjusting unit PAU 36. In the embodiments described here the parameter determining device is a part of the control system for the robot 10. Therefore the parameter determining device 32 also comprises a robot control unit RCU 35. The model memory 34 may, as an example, be a Random Access Memory (RAM). The parameter adjusting unit 36 is connected to the primary sensor 22 for receiving sensor measurements SM and to the robot control unit 35 in order to provide movement instructions MI, i.e. instructions on how the robot may be moved. The parameter adjusting unit 36 is also connected to the model memory 34 in order to send parameter updates PU to this memory 34 and for receiving model data MD from the model memory 34. The robot control unit 35 may be a conventional robot control unit providing electrical currents that controls the movement of the actuator and thereby the movement of a corresponding robot arm section.

Figure 4:
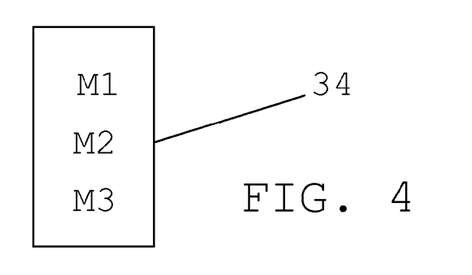

FIG. 4 schematically shows the content of the model memory 34. The model memory 34 may comprise three dynamical models M1, M2 and M3, a first dynamical model M1 associated with the robot, i.e. with the first and second arm sections, a second dynamical model M2 associated with the foundation and a third dynamical model M3 associated with the tool. At least the first and second models M1 and M2 may here be elastic dynamical models, i.e. with parameters defining elastic properties of the robot and the foundation, respectively.

Figure 5:
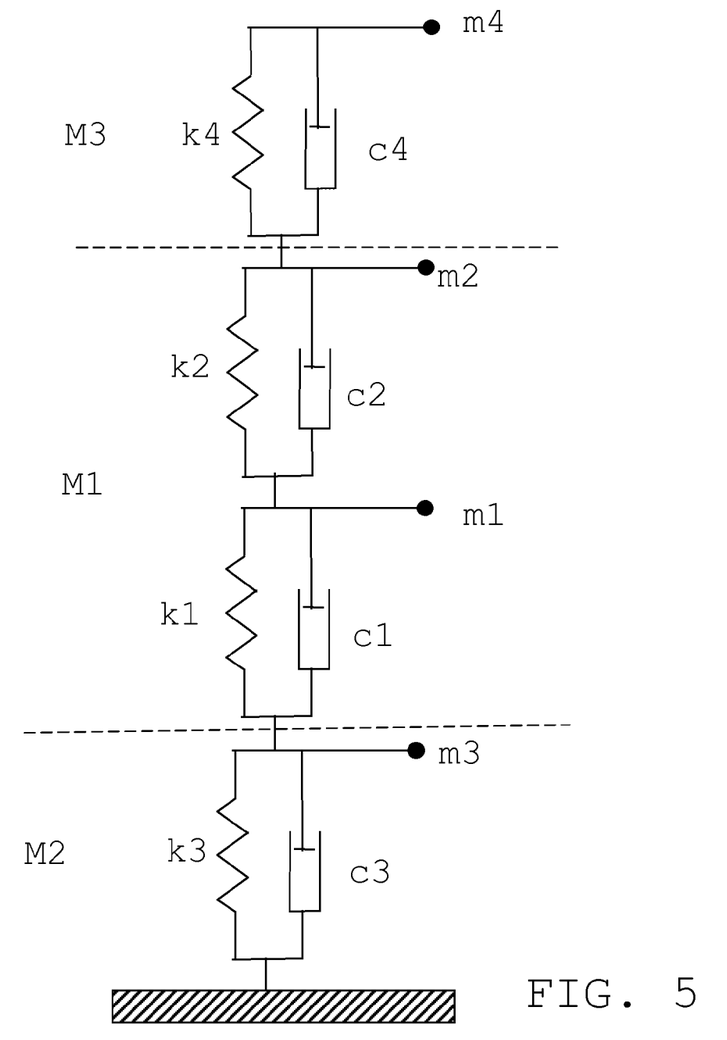

FIG. 5 schematically shows three simple variations of these models being connected to each other. The first model M1 comprises first model parameters representing dynamical properties of the robot. In the first model M1 each arm section is modeled as a combination of a mass parameter, a spring parameter and a damping parameter. The mass, spring and damping parameters are thus provided in groups of parameters, where each group comprises these three parameters. There is thus one corresponding spring and damping parameter for every mass parameter. In this example of the first model M1 there is one group of parameters per arm section. This group may be extended to more than one dimension, where both the spring and damper may be multi-dimensional and connected to a general rigid body, described by its mass, center of gravity an inertia tensor. There may be up to three dimensions for translational movement and up to three dimensions for rotational movement. The second and third models M1 and M3 may be provided in the same way.

In the simplified models shown in FIG. 5 the first model M1 comprises a first spring parameter k1 in parallel with a first damping parameter c1. These two parameters form a first pair of parameter values represent elastic properties of the first arm section 12. In series with these there is connected a parallel connection of a second spring parameter k2 and second damping parameter c2 forming a second pair of parameter values representing elastic properties of the second arm section 14. A first mass m1 of the first arm section 12 is connected to the junction where these two pairs are connected to each other. The first mass m1 is therefore connected to a first end of the second pair. A second mass m2 of the second arm section 14 is connected to the second end of the second pair.

The second model M2 comprises second model parameters representing dynamical properties of the foundation. In a similar manner the second model M2 for the foundation is therefore also represented by a third spring parameter k3 in parallel with a third damping parameter c3 forming a third pair of parameter values representing elastic properties of the foundation. This third pair is at a first end connected to ground and at a second end connected to the first parameter pair of the first model M1. Here a third mass m3 associated with the foundation is connected to the connection point between the first pair and the third pair.

In the figure there is also a third model M3 associated with a tool. This third model M3 comprises a fourth spring parameter k4 in parallel with a fourth damping parameter c4 forming a fourth pair of parameter values representing elastic properties of the tool. Here a first end of this fourth pair is connect to the second pair of the first model M1 and a second end of the fourth pair is connected to a fourth mass m4 representing the tool. As an alternative the fourth model may be simplified and only be represented by the fourth mass m4 directly connected to the second pair of the first model M1.

A total system model formed by the three models M1, M2 and M3 can therefore be seen as provided through the first end of the third pair of spring and damping parameters being connected to ground and the second end of this third pair being connected to a first end of the first pair of spring and damping parameters of the first model M1, with the second end of the first pair being connected to the first end of the second pair of spring and damping parameters of the first model M1. The second end of the second pair of the first model M1 is further connected to the first end of the fourth pair of spring and damping parameters of the third model M3. Here the third mass m3 of the foundation is connected to the junction between the third pair of the second model M2 and the first pair of the first model M1, the first mass m1 of the first arm section 12 of the robot connected to the junction between the first and second pairs of the first model M1, the second mass m2 of the second arm section 14 of the robot connected to the junction between the second pair of the first model M1 and the fourth pair of the third model M3. Finally the fourth mass m4 of the tool is connected to the second end of the fourth pair of the third model M3.

As was mentioned earlier, the models shown in FIG. 5 are simplified and each spring-damper-mass group may be extended to a multi-dimensional spring-damper connected to a general rigid body. It should also be realized that the three coupled models M1, M2 and M3 can be implemented as one model.

Figure 6:
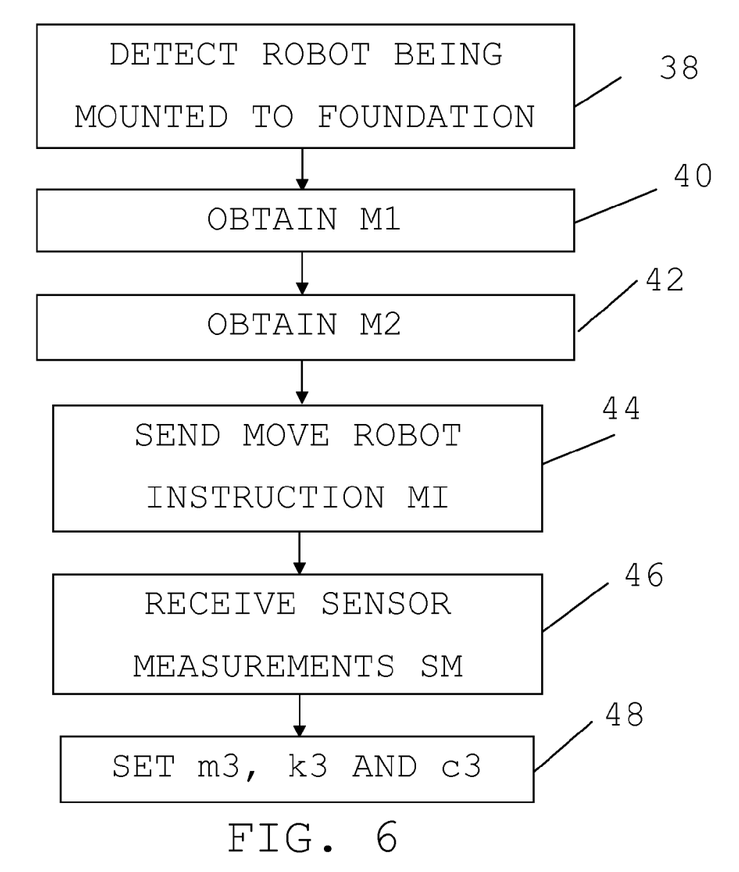
FIG. 6 shows a number of method steps being performed in a first method for tuning a dynamical model.
Figure 7:
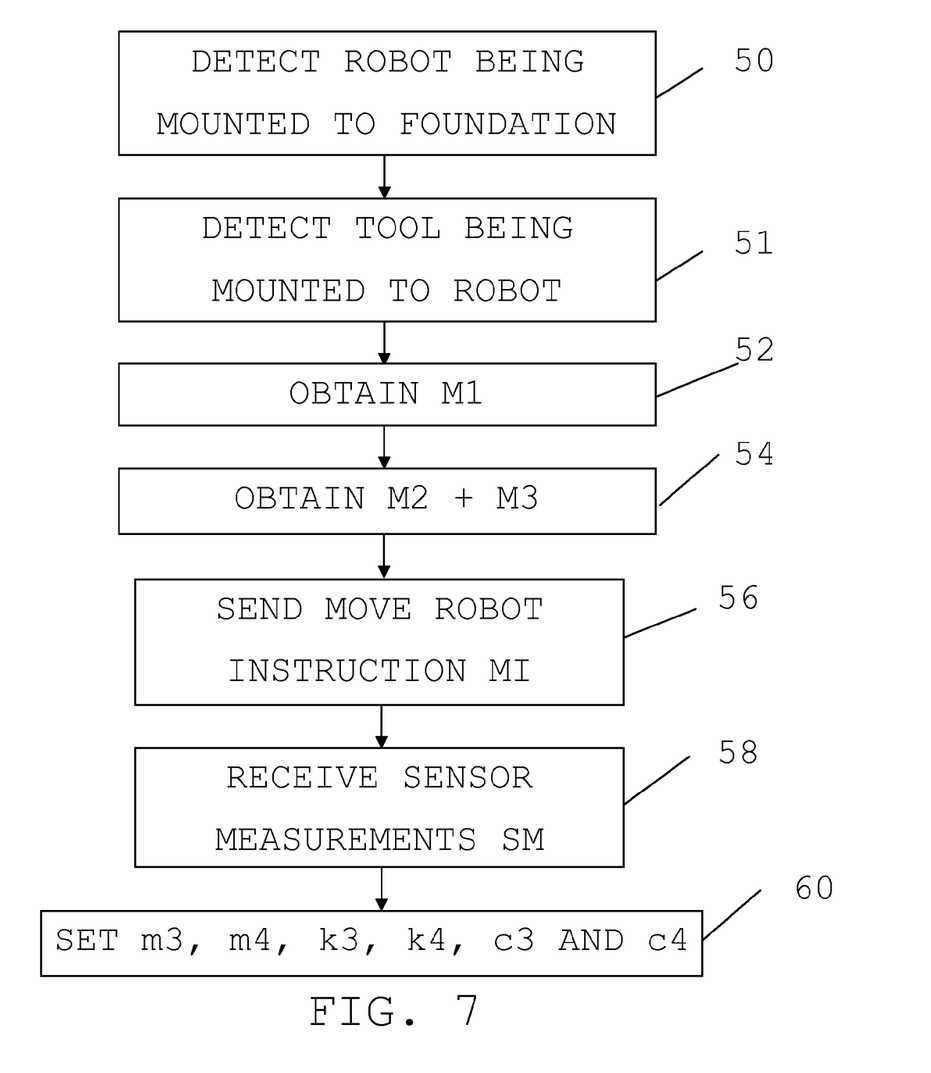
FIG. 7 shows a number of method steps being performed in a second method for tuning a dynamical model, and FIG. 8 schematically shows a computer program product in the form of a CD Rom disc comprising computer program code for tuning a dynamical model.

One embodiment of the invention will now be described with reference also being made to FIGS. 6 and 7, where FIG. 6 shows a number of method steps being performed in a first method for tuning the second dynamical model and FIG. 7 shows a number of method steps being performed in a second method for tuning the third dynamical model.

An industrial robot 10 provided in an industrial environment is typically placed on a foundation 26 and perhaps provided with a tool 28 for performing some task.

The control of the robot movement may then be performed based on a dynamic model of the robot. Here the elastic properties of the robot 10 as well as the elastic properties of the tool 28 may be included in the model. The foundation 26 has frequently been considered to be stiff enough to be omitted, for instance if it is made up of ground or if, when being separated from ground, being stiff enough to be considered to be a part of ground. However, it has also in some cases been included in the model, such as in the model described in EP 1 920 892.

The model is thus important and if it is not correctly tuned then the operational range of the robot 10 may be limited.

The inventors have realized that it is possible to view the model used in the control as a system of models, where there is a first model M1 provided for the robot 10, a second model M2 provided for the foundation 26 and a third model M3 provided for the tool 28. These models in combination are then used for controlling the robot 10. The models are furthermore made up of a number of parameters, such as spring parameters k1, k2, k3 and k4, damping parameters c1, c2, c3, c4, and mass parameters m1, m2, m3 and m4, as can be seen in FIG. 5.

Of these models the robot manufacturer is typically well aware of the first model M1 of the actual robot 10 and depending on the knowledge about the intended use also sometimes aware of the third model M3 of the tool 28. In other variations the tool may merely be considered to be a mass, in which case the third model M3 is no problem.

This means that the manufacturer may have previously tested the robot 10 or the robot type concerning the variables c1, c2, k1, k2, m1 and m2 of at least the first model M1. This means that the values of the variables of the first model M1 and sometimes also of the third model M3 may be pre-set and known when the robot is mounted on the foundation 26 for operation. However the foundation 26 is typically proprietary of the specific environment in which the robot 10 is to be placed. This means that the values of the variables c3, k3 and m3 of the second model M2 may be unknown.

Furthermore, as a robot is delivered, it is of interest to take it into operation as fast as possible. The number of adjustments needed of the dynamical models after a robot has been delivered and mounted on a foundation should therefore be a minimum. The invention is provided for addressing this issue.

A method according to a first embodiment of the invention therefore starts with a determination that the robot 10 has been mounted on the foundation 26. This may be done through the mounting being detected by the parameter determining unit 36, which may for this reason be equipped with a function sensing that the robot 10 is mounted on the foundation 26. The determination may also be made by a user at the site where the robot is placed. This user may see that the robot 10 has been mounted on the foundation 26 and therefore decide that the second dynamical model M2 is to be tuned. The activation of the tuning may then be made through a user selection via a keyboard of the parameter determining device 32. In the example given here the parameter adjusting unit 36 of the parameter determining device 32 thus detects whether the robot is mounted on the foundation 26, step 38. Thereafter the parameter adjusting unit 36 obtains the first model M1 from the model memory 34, step 40, and also obtains the second model M2 from the model memory 34, step 42, which may be done through fetching model data MD from the model memory 34. In this way the two models M1 and M2 are provided for being further processed. In this case the parameters of the first model M1 have previously received values or at least value ranges in which they are effective. There are thus values already assigned to these parameters in the model memory 34, i.e. there are pre-assigned values. The values of the parameters in the first model M1 may have been previously set based on sensor measurements obtained in response to movements made of the robot 10. The movement of the robot 10 may here have been made in a test set up using the ground as a foundation or using a foundation that is stiff enough to be considered to be a part of the ground. The movement may here be vibrational movement of the robot, for which position be detected for determining the parameter values.

It is here also possible that a tentative value range has been assigned to the parameters of the second model M2. The mass may for instance be known as well as the materials the foundation has been made of. Based on this data it is possible that initial values or initial value ranges have been assigned to the parameters of the second model M2.

When the parameter adjusting unit 36 has obtained model data MD of the first and second models M1 and M2, which model data comprises pre-set parameter values of the first model M1, the parameter adjusting unit 36 goes on and obtains information about dynamical properties of the foundation 26. This is done through moving the robot 10. The moving is in this example achieved through ordering the actuator 20 to move the robot 10. For this purpose the parameter adjusting unit 36 sends an instruction to move the robot 10 or a move robot instruction MI to the robot control unit 35, step 44, which in turn may provide an electric current to the actuator 20 making the actuator move according to the instruction, thereby also moving the robot 10. The instruction may be the instruction to perform any type of movement. In one variation of the invention the instruction is an instruction to vibrate. As the actuator 20 is provided for moving the second arm section 14, this vibration may then be a vibration of the second arm section 14. This instruction to vibrate may also comprise an instruction to scan a certain frequency range, which frequency range may be known through previous analyses of vibrations. The vibrations caused by the actuator 20 may thus be vibrations in the above-mentioned frequency range.

As the movement is performed by the actuator 20, measurements are also made by the primary sensor 22. The measurements are measurements of properties of the robot affected by the movement. In this example the primary sensor 22, which thus may be a position sensor attached to a servo motor, measures the position of the robot and here the position of the joint 16 and thereby also of the second arm section 14. The sensor measurements SM are then sent from the primary sensor 22 to the parameter adjusting unit 36. The parameter adjusting unit 36 thus receives the sensor measurements SM, step 46.

Based on the measurements it is then possible to determine the torque of the movement of the second arm section as well as a relationship between the position and torque, and the variation of this relationship with regard to frequency may therefore be determined. In this determination resonance frequencies of the whole system, i.e. of the system made up of the models M1 and M2 can be obtained. Resonance frequencies can be obtained through determining maximum and/or minimum points of the relationship in the scanned frequency range.

Based on a resonance frequency the values of the parameters $c_3$, $k_3$ and $m_3$ of the second model M2 may then be set. As the parameter values of the first model M1 are already known, then this setting can be made in a fast and simple way. The parameter adjusting unit 36 thus adjusts or sets the parameters of the second model $c_3$, $k_3$ and $m_3$, step 48, and in this way the second model M2 is tuned. The adjusted parameters, i.e. the determined values of the parameters $c_3$, $k_3$, $m_3$ in the second model M2, are then stored in the model memory 34 as parameter updates PU. In case the parameters of the first model M1 are only defined by value ranges, then these are here also tuned.

It can also be seen that the setting of the second model parameters may be triggered by the detecting of the robot being connected to the foundation.

It is thereby possible to use the robot employing the tuned model, which raises the efficiency of the robot and the accuracy of its use.

It is in the same way possible to also tune the model M3 of the tool 28.

The mounting of the tool 28 may also here be detected by the parameter determining unit 36, which may be equipped with a function sensing that the tool 28 is mounted on the robot 10. As an alternative a user may also here determine that the tool 28 has been mounted and make a tuning selection via a keyboard of the parameter determining device 32. In the example given here the parameter adjusting unit 36 of the parameter determining device 32 thus detects whether the robot is mounted on the foundation 26, step 50. It also detects whether the tool 28 is mounted to the tool holder of the robot 10, step 51. Thereafter the parameter adjusting unit 36 obtains the first model M1 from the model memory 34, step 52, and also obtains the second and third model M2 and M3 from the model memory 34, step 54. Also here it is possible that a tentative value range has been assigned to the parameters of the third model M3. The mass $m_4$ may for instance be known as well as the materials the tool 28 has been made of. Based on this data it is possible that initial values or initial value ranges have been assigned to the parameters of the third model M3.

When this has been done the parameter adjusting unit 36 of the parameter determining device 32 goes on and obtains information about dynamical properties of the tool 28 and foundation 26. This is done through ordering the actuator 20 to move the robot 10. For this purpose the parameter adjusting unit 36 sends a move robot instruction MI to the robot control unit 35, step 56, which in turn may provide an electric current to the actuator 20 making the actuator move according to the instruction, thereby also moving the robot 10. The instruction may also here be the instruction to perform any type of movement, such as vibrating with vibrations that scan a certain frequency range.

Measurements of properties affected by the movement, for instance properties of the robot such as position, are then sensed by the primary sensor 22 and sent to the parameter adjusting unit 36, which thus receives the sensor measurements SM, step 58.

Based on the measurements resonance frequencies are then determined in the same way as described above and the parameters of the second and third models c3, c4, k3, k4, m3 and m4 are then set, step 60. The set parameters, i.e. the determined values of these parameters, are then stored in the model memory 34 in order to provide tuned second and third models M2 and M3. In case the parameters of the first model M1 are only defined by value ranges, then these are also tuned.

It can here be seen that the setting of the third model parameters may be triggered by the detecting of the tool being connected to the robot. Thereafter it is possible to use the robot employing the model that has also been tuned with regard to the tool.

Since the tuning for the second and third models is performed at the same time, it is also fast and simple.

It should here be realized that as an alternative it is possible to first tune the parameters of the first and second models without any tool being mounted on the robot. This may later be followed by a separate tuning of the third model with the tool mounted on the robot.

This is advantageous if there are several different tools that can be mounted on the robot.

Figure 8:
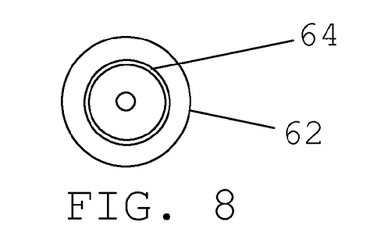

The parameter adjusting unit of the parameter determining device may be provided in the form of one or more processors together with computer program memory including computer program code for performing its function. As an alternative it may be provided in the form of an Application Specific Integrated Circuit (ASIC) or Field-Programmable Gate Array (FPGA). This computer program code may also be provided on one or more data carriers which perform the functionality of the parameter adjusting unit when the program code thereon is being loaded in a computer forming the parameter determining device. One such data carrier 62 with computer program code 64, in the form of a CD ROM disc, is schematically shown in FIG. 8. Such computer program may as an alternative be provided on a server and downloaded therefrom into the computer forming the parameter determining device.

There are a number of variations that may be made apart form those already described. If the third model is a simple model only comprising a mass, it needs not be tuned at all. Methods for estimating the rigid body parameters of the tool are common in modern robots.

The elastic elements can be provided for three dimensions as well as for both translational and rotational movement. The dynamical models of the elastic properties may furthermore be different than the ones described earlier. They are thus not limited to the use of one spring-damper-mass group per arm section, foundation or tool. Instead of such a lumped model, a model with distributed elasticity can also be used.

It is also possible that secondary sensors on the robot are used for estimating the parameters of the models M1, M2 and M3. In some cases they may also be used for detecting the mounting of the robot to the foundation and the mounting of a tool on the robot.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

What is claimed is:

1. A method for tuning a dynamical model of an industrial robot on a foundation, the method comprising the steps of:

providing, with a parameter determining device, a first dynamical model of the robot, the first dynamical model comprising first model parameters representing dynamical properties of the robot;

providing, with the parameter determining device, a second dynamical model of the foundation the robot is attached to, the second dynamical model comprising second model parameters representing dynamical properties of the foundation;

obtaining, with the parameter determining device, information about dynamical properties of the foundation by moving the robot and by measuring at least one property affected by the movement;

setting, with the parameter determining device, at least one of the second model parameters on the basis of the dynamical properties of the foundation; and controlling the robot using the first dynamical model and the second dynamical model.

2. The method according to claim 1, wherein the movement is implemented by at least one servo motor of the robot.

3. The method according to claim 1, wherein the second model parameters comprises at least one group of parameters, said group comprising a mass of the foundation, at least one corresponding spring parameter and at least one corresponding damping parameter.

4. The method according to claim 3, wherein there is more than one spring parameter and more than one damping parameter associated with the mass of the foundation in the second model.

5. The method according to claim 4, wherein the spring and damping parameters are multi-dimensional.

6. The method according to claim 1, wherein the parameters of the first model have pre-assigned values.

7. The method according to claim 1, further comprising the step of detecting whether the robot is connected to the foundation, wherein the performing of obtaining information about dynamical properties of the foundation and the setting of at least one of the second model parameters is triggered by the detection of the robot being connected to the foundation.

8. The method according to claim 1, further comprising providing a third dynamical model of a tool attached to the robot, the third dynamical model comprising third model parameters representing dynamical properties of the tool, obtaining information about dynamical properties of the tool by moving the robot and by measuring at least one property affected by the movement and setting at least one of the third model parameters on the basis of the dynamical properties of the tool.

9. The method according to claim 1, wherein the setting of the at least one of the second model parameters is based on knowledge of the first model parameter values.

10. The method according to claim 1, wherein the robot comprises a plurality of moveable arm sections and there is one group of parameters per arm section in the first dynamic model.

11. The method according to claim 1, wherein before the step of obtaining at least one of the second model parameters is unknown.

12. A robot arrangement comprising an industrial robot and a parameter determining device, the industrial robot comprising
a number of moveable arm sections,
at least one actuator for moving a corresponding arm section, and
at least one detector, the parameter determining device comprising
a non-transitory model memory comprising
a first dynamical model of the robot, the first dynamical model comprising
first model parameters representing dynamical properties of the robot; and
a second dynamical model of a foundation to which the robot is to be attached, the second dynamical model comprising second model parameters representing dynamical properties of the foundation; and
a parameter adjusting unit configured to
obtain information about dynamical properties of the foundation by ordering the actuator to move the robot and by receiving, from the detector, measurements of at least one property affected by the movement; and
set at least one of the second model parameters on the basis of the dynamical properties of the foundation.

13. The robot arrangement according to claim 12, wherein the second model parameters comprises at least one group of parameters, said group comprising a mass of the foundation, at least one corresponding spring parameter and at least one corresponding damping parameter.

14. The robot arrangement according to claim 12, wherein there is more than one spring parameter and more than one damping parameter associated with the mass of the foundation.

15. The robot arrangement according to claim 14, wherein the spring and damping parameters are multi-dimensional.

16. The robot arrangement according to claim 12, wherein the parameter adjusting unit is further configured to detect whether the robot is connected to the foundation and to obtain information about dynamical properties of the foundation and to set at least one of the second model parameters triggered by the detection of the robot being connected to the foundation.

17. The robot arrangement according to claim 12, wherein the model memory comprises a third dynamical model of a tool attached to the robot, the third dynamical model comprising third model parameters representing dynamical properties of the tool, where the parameter adjusting unit is further configured to obtain information about dynamical properties of the tool by ordering an actuator to move the robot, receive measurements of a property of the robot affected by the movement from a detector and set at least one of the third model parameters on the basis of the dynamical properties of the tool.

18. A computer program product for tuning a dynamical model of an industrial robot on a foundation, the industrial robot being equipped with a number of moveable arm sections, at least one actuator, and at least one detector, the computer program product comprising a non-transitory data carrier with computer program code which when run in a parameter determining device, causes the parameter determining device to
obtain a first dynamical model of the robot, the first dynamical model comprising first model parameters representing dynamical properties of the robot;
obtain a second dynamical model of the foundation to which the robot is to be attached, the second dynamical model comprising second model parameters representing dynamical properties of the foundation,
obtain information about dynamical properties of the foundation by ordering the actuator to move the robot and by receiving, from the detector, measurements of a property affected by said movement; and
set at least one of the second model parameters on the basis of the dynamical properties of the foundation.

* * * * *